G. E. SCHAEFFER.
SPOKE FASTENER.
APPLICATION FILED AUG. 24, 1908.
917,158.
Patented Apr. 6, 1909.
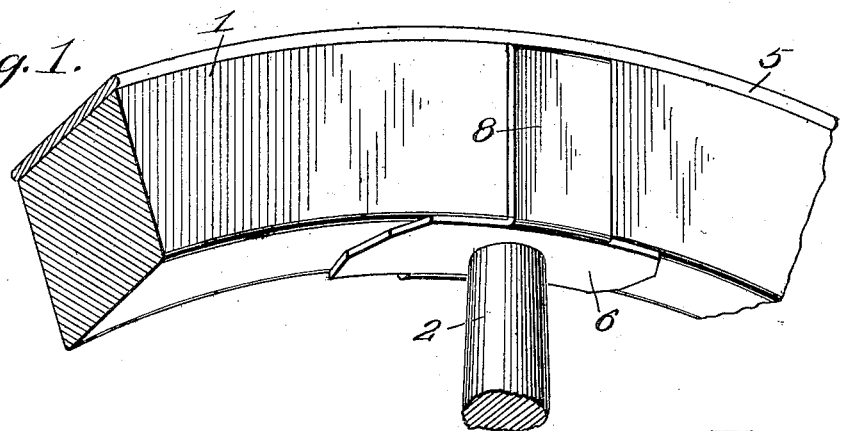
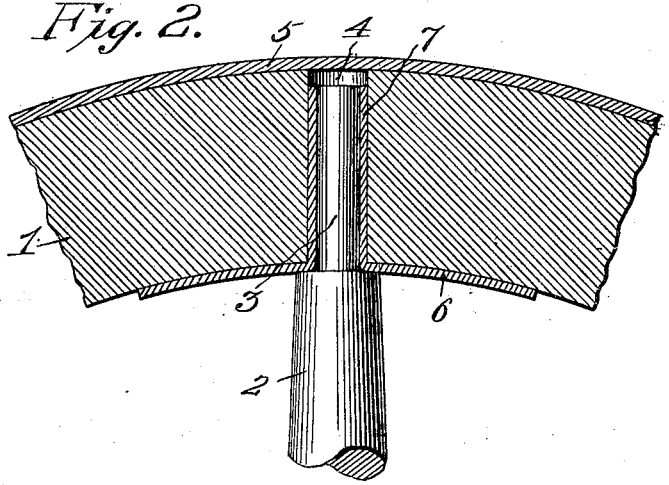
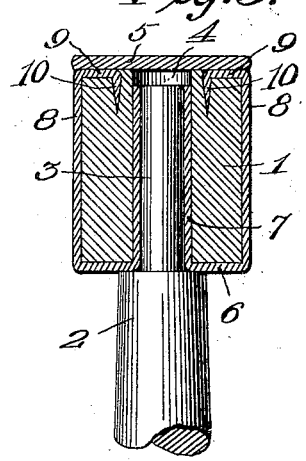
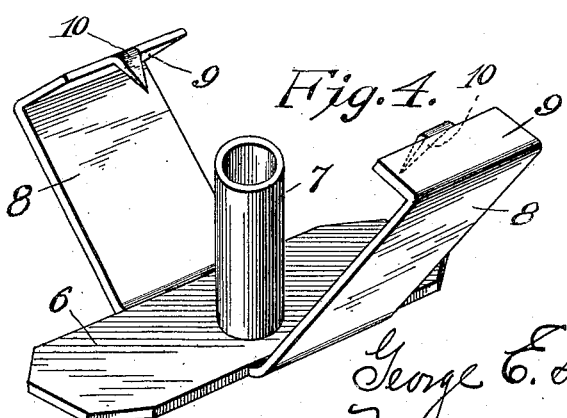
Witnesses
James F. Crown
J. M. Terry
Inventor
George E. Schaeffer
By Watson E. Coleman
Attorney

UNITED STATES PATENT OFFICE.

GEORGE E. SCHAEFFER, OF IRONDALE, MISSOURI.

SPOKE-FASTENER.

No. 917,153.　　　　Specification of Letters Patent.　　　　Patented April 6, 1909.

Application filed August 24, 1908. Serial No. 449,987.

*To all whom it may concern:*

Be it known that I, GEORGE E. SCHAEFFER, a citizen of the United States, residing at Irondale, in the county of Washington and State of Missouri, have invented certain new and useful Improvements in Spoke-Fasteners, of which the following is a specification, reference being had to the accompanying drawings.

This invention relates to improvements in spoke fasteners for vehicle wheels.

The object of the invention is to provide a simple and inexpensive metallic socket or fastening device by means of which a wooden spoke may be effectively secured to the felly or rim of the wheel.

With the above and other objects in view, the invention consists of the novel features of construction and the combination and arrangement of parts hereinafter fully described and claimed, and illustrated in the accompanying drawings, in which—

Figure 1 is a perspective view of a portion of the rim and one of the spokes of a wheel showing the improved spoke socket or fastener applied thereto; Figs. 2 and 3 are longitudinal and transverse sectional views through the same; and Fig. 4 is a perspective view of the fastener before being applied to the wheel.

In the drawings 1 denotes a portion of the felly or rim of the wheel of a buggy, wagon or other vehicle and 2 denotes one of the spokes having at one end a reduced portion or tenon 3 to enter a hole or socket 4 in the rim 1. 5 denotes the usual tire covering the outer surface of the rim or felly.

The improved spoke fastener comprises a face plate 6 adapted to engage the inner face of the rim 1 and having at its center an opening to receive the spoke tenon 3 and a tubular projection or sleeve 7 which surrounds said opening so as to receive said tenon and which is adapted to enter the socket 4 in the rim. The face plate 6 is longer than it is wide and formed integral with its side edges are flexible side flanges 8 adapted to be bent up against the opposite side faces of the rim 1 and to have their extremities bent inwardly at right angles to provide the portions 9 which engage the outer face of the rim beneath the tire 5 and are retained in position by the latter, as clearly shown in Fig. 3 of the drawings. By constructing the fastener of thin metal and as set forth the flanges 8 provide a simple and effective means for retaining the plate 6 and the sleeve 4 in the rim and they also serve to effectively protect the portion of the rim around the opening or socket 4, which portion is subjected to the greatest strain. The sleeve 7 forms an effective socket for the spoke tenon and prevents the wood of the spoke from coming in contact with the wood of the rim and thereby reducing wear of said parts to the minimum. When a spoke is secured by the improved fastening it will not work loose and there will be little or no danger of the rim or felly splitting as is usual where no metallic connection is provided for the spoke. In order to prevent the flexible side flanges 8 from spreading and their end portions 9 from slipping out from beneath the tire, spurs or prongs 10 are formed upon the ends of said portions 9 and are adapted to be driven into the felly or rim, as clearly shown in the drawings.

Having thus described the invention what is claimed is:

1. The combination with the rim having an opening, the tire, and the spoke of a wheel, of a metallic fastening comprising a face plate to engage the inner face of the rim and formed with an opening, a sleeve surrounding said opening and projecting from the inner face of the face plate, said sleeve being adapted to enter the opening in the rim and to receive the spoke, and flexible flanges projecting from the opposite side edges of the face plate and adapted to be bent against the opposite side faces of the rim and to have their extremities bent inwardly at right angles beneath the tire, substantially as set forth.

2. A metallic spoke socket or fastening comprising a face plate formed with an opening, a sleeve surrounding said opening and projecting from the inner face of said plate to form a spoke socket, flexible flanges upon the opposite sides of the face plate and adapted to embrace the opposite sides of the rim or felly and to have their extremities bent inwardly at right angles beneath the tire, and spurs formed upon the inwardly bent extremities of the flanges and adapted to be driven into the felly or rim, substantially as set forth.

In testimony whereof I hereunto affix my signature in the presence of two witnesses.

GEORGE E. SCHAEFFER.

Witnesses:
T. B. WELCH,
JONATHAN WISHON.